US012690076B2

(12) United States Patent
Tyagi

(10) Patent No.: US 12,690,076 B2
(45) Date of Patent: Jul. 21, 2026

(54) MANAGING LOST CONNECTION WITH USER PLANE FUNCTION (UPF) NODE IN CELLULAR NETWORK

(71) Applicant: Boost SubscriberCo L.L.C., Englewood, CO (US)

(72) Inventor: Vineet Tyagi, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 226 days.

(21) Appl. No.: 18/596,370

(22) Filed: Mar. 5, 2024

(65) Prior Publication Data

US 2025/0287434 A1 Sep. 11, 2025

(51) Int. Cl.
*H04W 76/10* (2018.01)
*H04L 1/08* (2006.01)
*H04L 61/5007* (2022.01)

(52) U.S. Cl.
CPC ............... *H04W 76/10* (2018.02); *H04L 1/08* (2013.01); *H04L 61/5007* (2022.05)

(58) Field of Classification Search
CPC ...... H04W 76/10; H04L 1/08; H04L 61/5007; H04L 1/1825; H04L 1/188; H04L 1/1887
See application file for complete search history.

(56) References Cited

U.S. PATENT DOCUMENTS

2025/0015940 A1* 1/2025 Mehta ..................... G06F 11/14

FOREIGN PATENT DOCUMENTS

WO WO-2024219551 A1 * 10/2024 .......... H04L 61/4511

* cited by examiner

*Primary Examiner* — Chuong A Ngo
(74) *Attorney, Agent, or Firm* — Lowenstein Sandler LLP

(57) ABSTRACT

A method includes transmitting, by a centralized unit user plane (CU-UP) logical node, an echo request message to a first user plane function (UPF) node to facilitate interchange of client data between a user equipment (UE) and the first UPF node. In response to failing to receive an echo response message, corresponding to the echo request message, from the first UPF node within a timeout period, the CU-UP logical node retransmits the echo request message to the first UPF node. In response to retransmitting a predetermined number of echo request messages without receipt of a corresponding echo response message from the first UPF node, the CU-UP logical node causes reassignment of a workload of the first UPF node to a second UPF node with which the CU-UP logical node is communicating.

20 Claims, 7 Drawing Sheets

MANAGING LOST CONNECTION WITH USER PLANE FUNCTION (UPF) NODE IN CELLULAR NETWORK

BACKGROUND

One type of cellular network is a Fifth generation (5G) wireless network, although this disclosure may apply to other modern cellular networks, including a 6G wireless network. In a 5G wireless network, a 5G Core Network (5G core) is responsible for managing and routing data traffic, providing various network resources and services, and supporting the core functionalities of the cellular network. Fifth generation (5G) wireless networks have the promise to provide higher throughput, lower latency, and higher availability compared with previous global wireless standards. A combination of control and user plane separation (CUPS) and multi-access edge computing (MEC), which allows compute and storage resources to be moved from a centralized cloud location to the "edge" of a network and closer to end user devices and equipment, may enable low-latency applications with millisecond response times. A control plane (CP) may include a part of a network that controls how data packets are forwarded or routed. The control plane may be responsible for populating routing tables or forwarding tables to enable data plane functions. A data plane (or forwarding plane) may include a part of a network that forwards and routes data packets based on control plane logic. Control plane logic may also identify packets to be discarded and packets to which a high quality of service should apply.

User plane function (UPF) nodes may be located within the core network and be configured to transport IP data traffic (e.g., user plane traffic) between user equipment (UE) and a data network and for handling packet data unit (PDU) sessions with the data network. User plane function or UPF nodes may support the separation of control plane (CP) and user plane (UP) functions in the 5G architecture. This separation allows for independent scaling, flexibility, and deployment of the control and user plane functions.

A centralized unit (CU) of a radio access network (e.g., which interacts more directly with the UE) may include a CU user plane (CU-UP) portion. The CU-UP portion may correspond with the centralized unit for the user plane. The CU-UP portion may perform functions related to a user plane, such as user data transmission and reception functions, which includes General Packet Radio Services (GPRS) Tunneling Protocol for the UP (or GTP-U). The GTP-U protocol enables the CU-UP portion to build virtual GTP tunnels between a base station (or gNB) and the UPF node.

To build such GTP tunnels and maintain these tunnels, the CU-UP portion may transmit echo request messages to UPF nodes within the core network with which the CU-UP portion communicates to facilitate transfer of data between the data network and each UE in its network. For example, UEs may be assigned to different UPF nodes, which assignments are tracked by the CU-UP portion. In some cases, if a UPF node is unresponsive to echo request messages, the CU-UP portion sends out a failure message and the UEs assigned to such a UPF node will experience a service interruption, e.g., loss of data and voice services, which is a highly undesirable degradation of quality of service.

BRIEF DESCRIPTION OF THE DRAWINGS

The present disclosure is illustrated by way of example, and not by way of limitation, in the figures of the accompanying drawings.

DETAILED DESCRIPTION

Figure 1A:
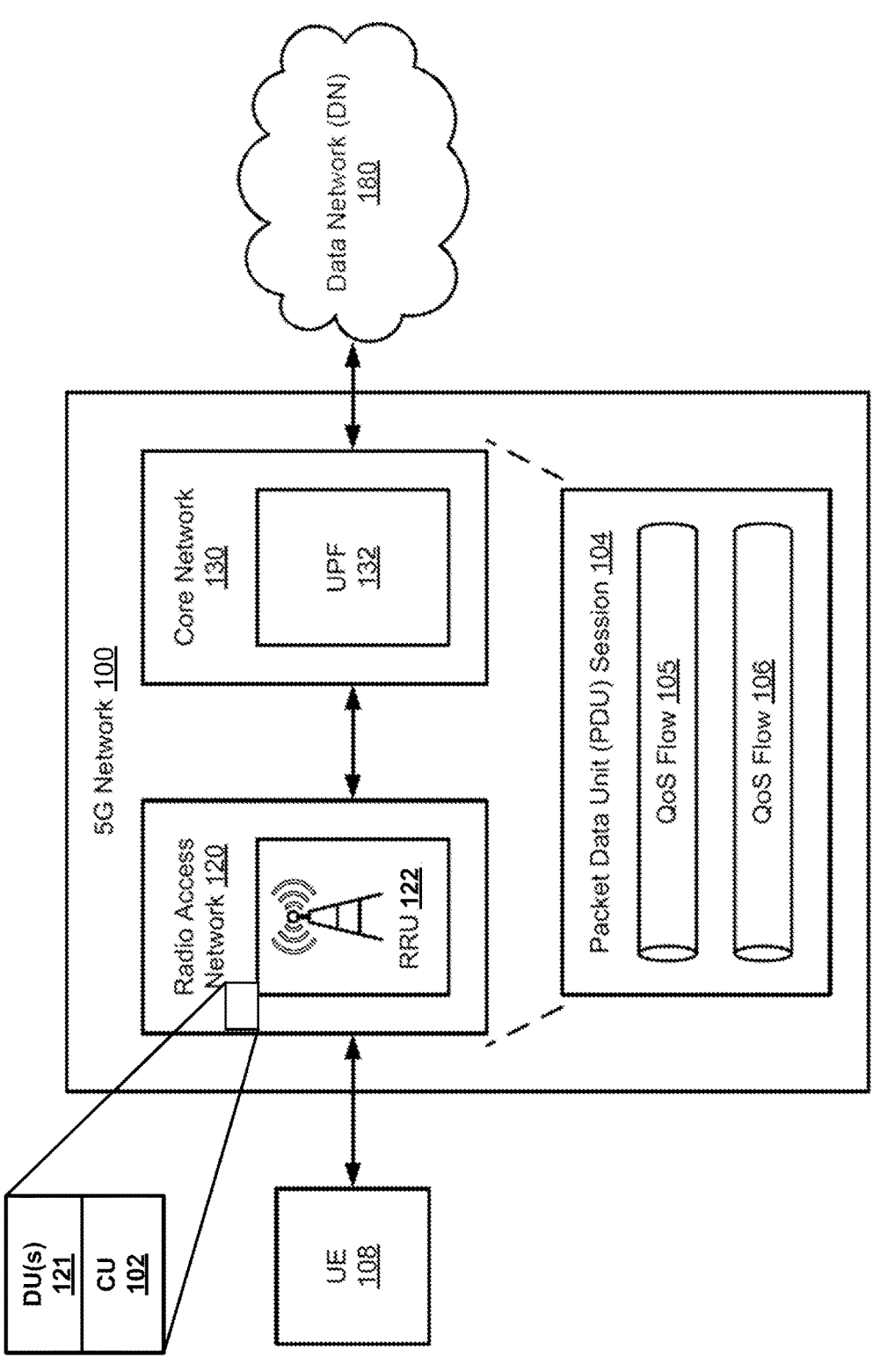
FIG. 1A depicts a 5G network including a radio access network (RAN) and a core network according to at least one embodiment.

Technologies for managing a lost connection with a UPF node in a cellular network (e.g., 5G wireless network, 6G wireless network) are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

As described above, a CU-UP logical node may transmit an echo request message to a UPF node to build and maintain GTP tunnels, facilitating transfer of data between the data network and each UE in its network. For example, UEs may be assigned to different UPF nodes, which assignments are tracked by the CU-UP logical node. The CU-UP logical node may transmit an echo request message to a connected UPF node every predetermined number of seconds to ensure that the UPF node is active and a GTP tunnel may be accessed at both ends. If an echo response message is not received for any corresponding echo request message (e.g., after a certain timeout period), the CU-UP logical node may retransmit the echo request message. Only so many of these echo request messages can be retransmitted before the CU-UP logical node may transmit an echo response failure and drop the Internet Protocol (IP) address of the UPF node. Once the CU-UP logical node drops the IP address of a UPF node, an indefinite service interruption period may result between the CU-UP logical node (and its supported UEs) and the UPF node. This service interruption may include the loss of data and voice services, causing a degradation of quality of service for the affected UE(s).

Aspects and embodiments of the present disclosure address the above and other deficiencies by managing the connection (e.g., GTP-U tunnel(s)) between the CU-UP logical node and an unresponsive UPF node to minimize or eliminate service interruption. In some embodiments, this management may involve varying timeout periods, the number of acceptable retransmitted echo request messages, and ultimately, deciding when and to which second UPF node to reassign the workload of the unresponsive UPF node.

In various embodiments, for example, the CU-UP logical node may transmit an echo request message to a first UPF node to facilitate interchange of client data between a user equipment (UE) and the first UPF node. In embodiments, the echo request message includes an internet protocol (IP)

address of the first UPF node, which IP address is also stored in a list of supported IP addresses in the CU-UP logical node. In response to failing to receive an echo response message, corresponding to the echo request, from the first UPF node within a timeout period, the CU-UP logical node may retransmit the echo request message to the first UPF node. Further, in response to retransmitting a predetermined number of echo request messages without receipt of a corresponding echo response message from the first UPF node, the CU-UP logical node may cause reassignment of a workload of the first UPF node to a second UPF node with which the CU-UP logical node is communicating.

In some embodiments, causing reassignment of the workload to the second UPF node includes transferring, to the second UPF node, critical state information associated with the first UPF node to maintain session continuity with the UE. In various embodiments, the critical state information includes a session identifier, a speed of connection, and/or information about data tunnels. This information about data tunnels (e.g., GTP-U tunnels) may include tunnel identifiers, endpoint information, a security profile, and the like, or a combination thereof. In embodiments, the CU-UP logical node reassigns a second IP address of the second UPF node to the UE within a list of IP addresses managed by the CU-UP logical node.

Therefore, advantages of the systems and methods implemented in accordance with some embodiments of the present disclosure include, but are not limited to, providing a way to avoid or at least significantly shorten service outage periods due to an unresponsive UPF node that supports one or more UEs. By limiting or eliminating service outage periods due to failed GTP-U tunnels, UEs that are supported by an unresponsive UPF node may rapidly sec restoration of any temporarily interrupted voice and data services. These and other advantages that would be apparent to those skilled in the art will be apparent from the following more detailed discussion.

FIG. 1A depicts a 5G network 100 including a radio access network (RAN) 120 and a core network 130 according to at least one embodiment. The RAN 120 can include a new-generation radio access network (NG-RAN) that uses the 5G new radio interface (NR). The 5G network 100 connects user equipment (UE) 108 to the data network (DN) 180 using the RAN 120 and the core network 130. The data network 180 can include the Internet, a local area network (LAN), a wide area network (WAN), a private data network, a wireless network, a wired network, or a combination of networks. The UE 108 can include an electronic device with wireless connectivity or cellular communication capability, such as a mobile phone 110 or handheld computing device 112. In at least one example, the UE 108 can include a 5G smartphone or a 5G cellular device that connects to the RAN 120 via a wireless connection. The UE 108 can include one of a number of UEs not depicted that are in communication with the RAN 120. The UEs may include mobile and non-mobile computing devices. The UEs may include laptop computers, desktop computers, an Internet-of-Things (IoT) devices, and/or any other electronic computing device that includes a wireless communications interface to access the RAN 120.

In at least some embodiments, the RAN 120 includes one or more distributed units (DU(s)) 121, a central unit (CU) 102, and a remote radio unit (RRU) 122 for wirelessly communicating with UE 108. In some embodiments, the DU(s) 121 and the CU 102 of the RAN 120 may be co-located with the RRU 122. In other embodiments, the DU(s) 121 and the remote radio unit (RRU) 122 may be co-located at a cell site and the CU 102 may be located within a local data center (LDC) that is in close proximity to the cell site.

In embodiments, the split DU/CU architecture may provide flexibility, scalability, and efficiency in network deployment and operation. For example, each DU 121 may handle the real-time, lower-layer aspects of baseband processing, including the lower layer of the protocol stack, acting as intermediary between the CU 102 and the RRU 122. The DU 121 functionality may include physical layer (PHY) functions such as error correction, modulation/demodulation, and forward error correction (FEC). These DUs 121 may be responsible for dynamic radio resource management tasks, including scheduling of user data, allocation of radio resources, power control, and interference management, all towards optimizing the performance and efficiency of the radio access network.

In at least some embodiments, the CU 102 may communicate with the core network 130 and include a CU user plane (CU-UP) logical node and a CU control plane (CU-CP) logical node, as will be discussed in more detail with reference to FIGS. 2B-2C. The CU 102 may handle control plane functions of the RAN 120, managing signaling between the UE 108 and the core network 130. This includes session management, mobility management, and establishing bearers (data channels). Although the CU 102 is primarily focused on control plane functions, in some architectures, the CU 102 may also handle aspects of user plane processing, such as packet routing and forwarding, especially in architectures where the CU and DU functionalities are integrated to some extent. The CU 102 may also serve as the interface point to the 5G Core Network (5GC) through the N2 interface for control plane messages and the N3 interface for user plane data, depending on the architecture and deployment.

In various embodiments, the CU 102 manages the mobility as users move across different cells or as they transition between different RAN technologies (e.g., from 5G NR to LTE). The CU 102 may be responsible for establishing, modifying, and releasing sessions and bearers for the UE 108, coordinating resources across the RAN 120 to ensure quality of service (QoS) requirements are met. The CU 102 may also play a role in executing security protocols for the RAN 120, including key management for encryption and integrity protection of the signaling and user data. With network slicing being a central feature of 5G, the CU 102 can manage the control plane aspects of network slices within the RAN 120, ensuring that slice-specific requirements for performance, latency, and reliability are met. In addition to interfacing with the core network, the CU 102 may also communicate with other RAN components, such as other CUs and DUs, for functions like load balancing, inter-cell handover, and dual connectivity.

The RRU 122 can include a Radio Unit (RU) and may include one or more radio transceivers for wirelessly communicating with UE 108. The remote radio unit (RRU) 122 may include circuitry for converting signals sent to and from an antenna of a Base Station into digital signals for transmission over packet networks. The RAN 120 may correspond with a 5G radio Base Station that connects user equipment to the core network 130. The 5G radio Base Station may be referred to as a generation Node B, a "gNodeB," or a "gNB." A Base Station may refer to a network element that is responsible for the transmission and reception of radio signals in one or more cells to or from user equipment, such as UE 108.

The core network 130 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane (CP) functions 140 (FIG. 1C) may interact with each other using the service-based architecture. In at least one embodiment, a microservices-based architecture in which software is composed of small independent services that communicate over well-defined APIs may be used for implementing some of the core network functions. For example, CP network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions can include the access and mobility management function (AMF), the session management function (SMF), and a user plane function (UPF) node, all of which may provide user session capability and user data. The UPF (e.g., UPF node 132) may perform packet processing including routing and forwarding, quality of service (QoS) handling, and packet data unit (PDU) session management. The UPF node 132 may serve as an ingress and egress point for user plane traffic and provide anchored mobility support for user equipment. For example, the UPF node 132 may provide an anchor point between the UE 108 and the data network 180 as the UE 108 moves between coverage areas. The AMF may act as a single-entry point for an UE connection and perform mobility management, registration management, and connection management between a data network and UE. The SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice can include an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the RAN 120, such as the DUs 121 and the CU 101, may need to be deployed at a cell site or in an LDC that is in close proximity to a cell site such that the latency requirements are satisfied (e.g., such that the one-way latency from the cell site to the DU component or CU component is less than ~1.2 milliseconds (ms)).

The 5G network 100 may provide one or more network slices, where each network slice may include a set of network functions that are selected to provide specific telecommunications services. For example, each network slice can include a configuration of network functions, network applications, and underlying cloud-based compute and storage infrastructure. In some cases, a network slice may correspond with a logical instantiation of a 5G network, such as an instantiation of the 5G network 100. In some cases, the 5G network 100 may support customized policy configuration and enforcement between network slices per service level agreements (SLAs) within the RAN 120. User equipment, such as UE 108, may connect to multiple network slices at the same time (e.g., eight different network slices). In one embodiment, a PDU session, such as PDU session 104, may belong to only one network slice instance. In some cases, the 5G network 100 may dynamically generate network slices to provide telecommunications services for various use cases, such as enhanced Mobile Broadband (eMBB), Ultra-Reliable and Low-Latency Communication (URLLC), and massive Machine Type Communication (mMTC) use cases.

A cloud-based compute and storage infrastructure can include a networked computing environment that provides a cloud computing environment. Cloud computing may refer to Internet-based computing, where shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 130 may include a set of network elements that are configured to offer various data and telecommunications services to subscribers or end users of user equipment, such as UE 108. Examples of network elements include network computers, network processors, networking hardware, networking equipment, routers, switches, hubs, bridges, radio network controllers, gateways, servers, virtualized network functions, and network functions virtualization infrastructure. A network element can include a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine (VM). A virtual machine can include a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The 5G network 100 may implement various network functions, such as the core network functions and radio access network functions, using a cloud-based compute and storage infrastructure. A network function may be implemented as a software instance running on hardware or as a virtualized network function. Virtual network functions (VNFs) can include implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 1A, the core network 130 includes a user plane function (UPF) node 132 for transporting IP data traffic (e.g., user plane traffic) between the UE 108 and the data network 180 and for handling PDU sessions with the data network 180. The UPF node 132 can include an anchor point between the UE 108 and the data network 180. The UPF node 132 may be implemented as a software process or application running within a virtualized infrastructure or a cloud-based compute and storage infrastructure. The 5G network 100 may connect the UE 108 to the data network 180 using a PDU session 104, which can include part of an overlay network.

The PDU session 104 may utilize one or more quality of service (QoS) flows, such as QoS flows 105 and 106, to exchange traffic (e.g., data and voice traffic) between the UE 108 and the data network 180. The one or more QoS flows can include the finest granularity of QoS differentiation within the PDU session 104. The PDU session 104 may belong to a network slice instance through the 5G network 100. To establish user plane connectivity from the UE 108 to the data network 180, an AMF that supports the network slice instance may be selected and a PDU session via the network slice instance may be established. In some cases, the PDU session 104 may be of type IPv4 or IPv6 for transporting IP packets. The RAN 120 may be configured to establish and release parts of the PDU session 104 that cross the radio interface.

The RAN 120 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 108, over a geographic area. Some cells may correspond with stationary coverage areas and other cells may correspond with coverage areas that change over time (e.g., due to movement of a mobile RRU).

In some cases, the UE 108 may be capable of transmitting signals to and receiving signals from one or more RRUs within the network of cells over time. One or more cells may correspond with a cell site. The cells within the network of cells may be configured to facilitate communication between UE 108 and other UEs and/or between UE 108 and a data network, such as data network 180. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mmWave frequencies with high-speed connectivity to UEs within a short distance of the small cells. Macrocells may transmit and receive radio signals using multiple-input multiple-output (MIMO) antennas that may be connected to a cell tower, an antenna mast, or a raised structure.

Referring to FIG. 1A, the UPF node 132 may be responsible for routing and forwarding user plane packets between the RAN 120 and the data network 180. Uplink packets arriving from the CU-UP of the RAN 120 may use a general packet radio service (GPRS) tunneling protocol (or GTP) to reach the UPF node 132. The GPRS tunneling protocol for the user plane (GTP-U) may support multiplexing of traffic from different PDU sessions by tunneling user data over the interface between the RAN 120 and the UPF node 132.

The UPF node 132 may remove the packet headers belonging to the GTP tunnel before forwarding the user plane packets towards the data network 180. As the UPF node 132 may provide connectivity towards other data networks in addition to the data network 180, the UPF node 132 ensures that the user plane packets are forwarded towards the correct data network. Each GTP tunnel may belong to a specific PDU session, such as PDU session 104. Each PDU session may be set up towards a specific data network name (DNN) that uniquely identifies the data network to which the user plane packets should be forwarded. The UPF node 132 may keep a record of the mapping between the GTP tunnel, the PDU session, and the DNN for the data network to which the user plane packets are directed.

Downlink packets arriving from the data network 180 are mapped onto a specific QoS flow belonging to a specific PDU session before being forwarded towards the appropriate RAN 120. A QoS flow may correspond with a stream of data packets that have equal quality of service (QoS). A PDU session may have multiple QoS flows, such as the QoS flows 105 and 106 that belong to PDU session 104. The UPF node 132 may use a set of service data flow (SDF) templates to map each downlink packet onto a specific QoS flow. The UPF node 132 may receive the set of SDF templates from a session management function (SMF), such as the SMF 133 depicted in FIG. 1B, during setup of the PDU session 104. The SMF may generate the set of SDF templates using information provided from a policy control function (PCF), such as the PCF 135 depicted in FIG. IC. The UPF node 132 may track various statistics regarding the volume of data transferred by each PDU session, such as PDU session 104, and provide the information to an SMF.

Figure 1B:
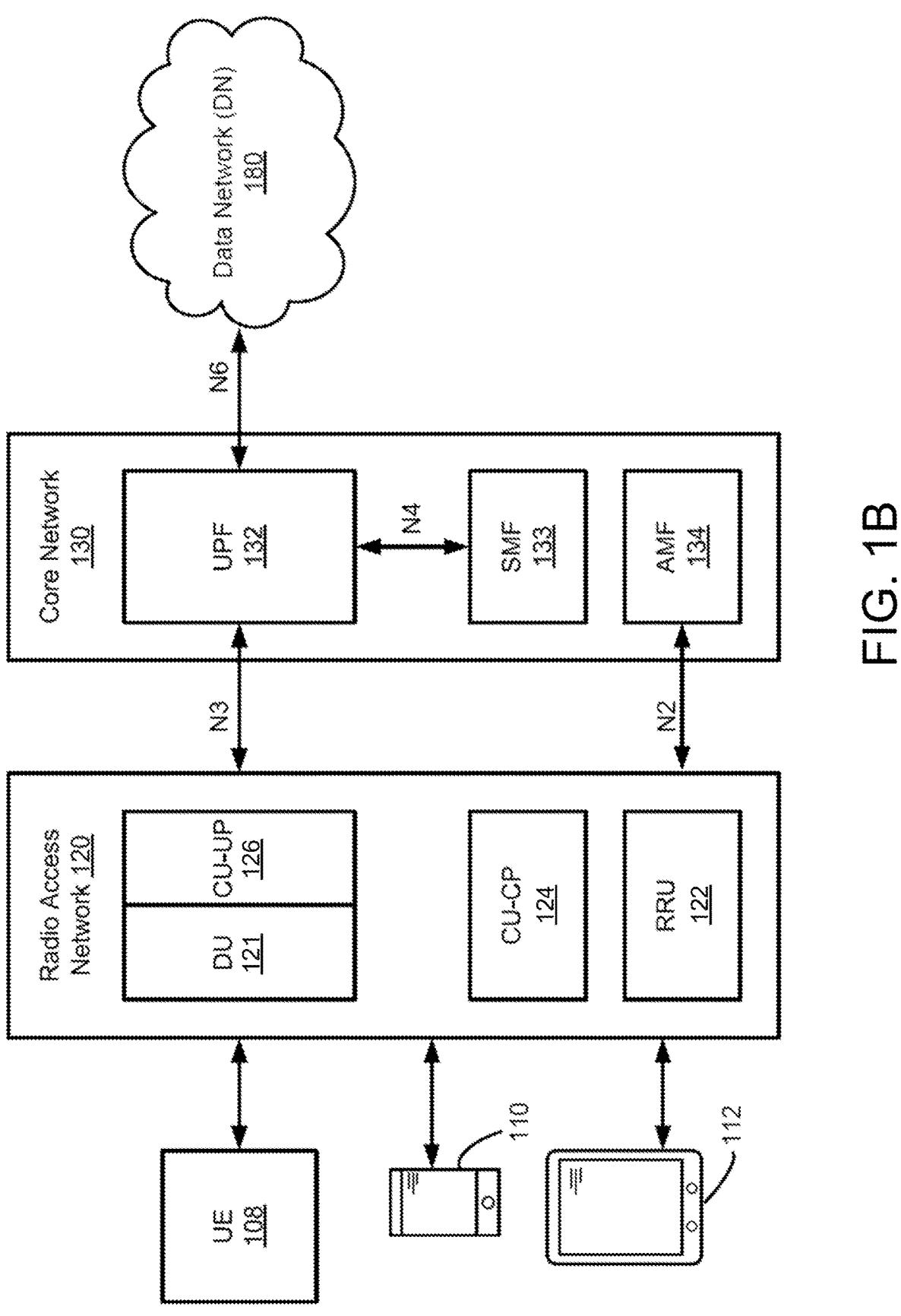
FIG. 1B-FIG. 1C depict a radio access network and a core network for providing a communications channel (or channel) between user equipment and a data network according to various embodiments.
Figure 1C:
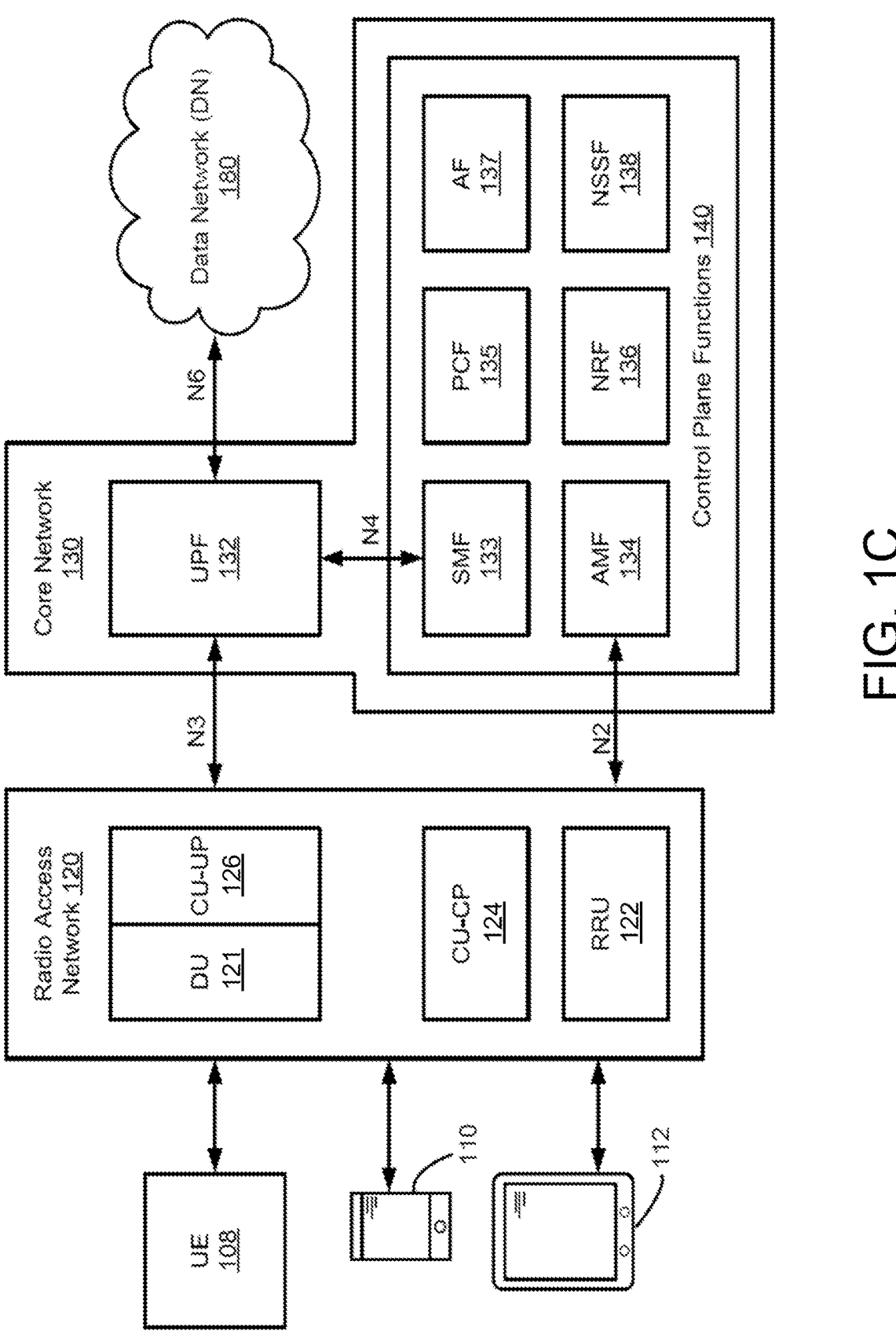

FIG. 1B depicts a RAN 120 and a core network 130 for providing a communications channel (or channel) between user equipment and data network 180 according to at least one embodiment. The communications channel can include a pathway through which data is communicated between the UE 108 and the data network 180. The user equipment in communication with the RAN 120 includes UE 108, mobile phone 110, and mobile computing device 112. The user equipment may include a set of electronic devices, including mobile computing devices and non-mobile computing devices.

The core network 130 includes network functions such as an access and mobility management function (AMF) 134, a session management function (SMF) 133, and a user plane function (UPF) node 132. The AMF may interface with user equipment and act as a single-entry point for a UE connection. The AMF may interface with the SMF to track user sessions, including authenticating the UE 108, assigning the UE 108 an IP address, and creating a session for the UE 108. The AMF may interface with a network slice selection function (NSSF) (not depicted) to select network slice instances for user equipment, such as UE 108. When a UE is leaving a first coverage area and entering a second coverage area, the AMF 134 may be responsible for coordinating the handoff between the coverage areas whether the coverage areas are associated with the same radio access network or different radio access networks. The SMF 133 may also manage security of the UE 108 and ensure that user data is protected.

The UPF node 132 may transfer downlink data received from the data network 180 to user equipment, such as UE 108, via the RAN 120 and/or transfer uplink data received from user equipment to the data network 180 via the RAN 120. An uplink can include a radio link through which user equipment transmits data and/or control signals to the RAN 120. A downlink can include a radio link through which the RAN 120 transmits data and/or control signals to the user equipment. The UPF node 132 may thus be responsible for functions such as packet routing, packet forwarding, and packet filtering.

The RAN 120 may be logically divided into a remote radio unit (RRU) 122, the DU 121, and CU 102 (FIG. 1A) that is partitioned into a CU-UP logical node 126 and a CU-CP logical node 124. The CU-UP logical node 126 may correspond with the centralized unit for the user plane and the CU-CP logical node 124 may correspond with the centralized unit for the control plane. The CU-CP logical node 124 may perform functions related to a control plane, such as connection setup, mobility, and security. The CU-UP logical node 126 may perform functions related to a user plane, such as user data transmission and reception functions. Additional details of radio access networks are described in reference to FIGS. 3A-3B.

Decoupling control signaling in the control plane from user plane traffic in the user plane may allow the UPF 132 to be positioned in close proximity to the edge of a network compared with the AMF 134. As a closer geographic or topographic proximity may reduce the electrical distance, this means that the electrical distance from the UPF 132 to the UE 108 may be less than the electrical distance of the AMF 134 to the UE 108. The RAN 120 may be connected to the AMF 134, which may allocate temporary unique identifiers, determine tracking areas, and select appropriate policy control functions (PCFs) for user equipment, via an N2 interface. The N3 Interface may be used for transferring user data (e.g., user plane traffic) from the RAN 120 to the user plane function UPF 132 and may be used for providing low-latency services using edge computing resources. The electrical distance from the UPF 132 (e.g., located at the edge of a network) to user equipment, such as UE 108, may impact the latency and performance services provided to the user equipment. The UE 108 may be connected to the SMF 133 via an N1 interface not depicted, which may transfer UE information directly to the AMF 134. The UPF 132 may be connected to the data network 180 via an N6 interface. The N6 interface may be used for providing connectivity between the UPF 132 and other external or internal data networks (e.g., to the Internet). The RAN 120 may be connected to the SMF 133, which may manage UE context and network handovers between Base Stations, via the N2 interface. The N2 interface may be used for transferring control plane signaling between the RAN 120 and the AMF 134.

The RRU 122 may perform physical layer functions, such as employing orthogonal frequency-division multiplexing (OFDM) for downlink data transmission. In some cases, the DU 121 may be located at a cell site (or a cellular Base Station) and may provide real-time support for lower layers of the protocol stack, such as the radio link control (RLC) layer and the medium access control (MAC) layer. The CU 102 may provide support for higher layers of the protocol stack, such as the service data adaptation protocol (SDAP) layer, the packet data convergence control (PDCP) layer, and the radio resource control (RRC) layer. The SDAP layer can include the highest L2 sublayer in the 5G NR protocol stack. In some embodiments, a radio access network may correspond with a single CU that connects to multiple DUs 121 (e.g., 10 DUs), and each DU may connect to multiple RRUs (e.g., 18 RRUs). In this case, a single CU may manage 10 different cell sites (or cellular Base Stations) and 180 different RRUs.

In some embodiments, the RAN 120 or portions of the RAN 120 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 121 and CU-UP 126 may be executed as virtual instances within a data center environment that provides single-digit millisecond latencies (e.g., less than 2 ms) from the virtual instances to the UE 108.

Embodiments described herein may use containerization to implement such microservices. Containerization is the packaging of software code with just the operating system (OS) libraries and dependencies required to run the code to create a single lightweight executable (a container) that runs consistently on any infrastructure. Software platforms, such as Kubernetes, manage containerized workloads and automate the deployment, scaling, and management of containerized applications. Compared to virtual machines (VMs) containers have relaxed isolation properties to share the OS among the applications. Therefore, containers are considered lightweight. A container has its own file system, share of CPU, memory and process space. As they are decoupled from the underlying infrastructure, containers are portable across clouds and OS distributions.

A cluster is made up of nodes that run containerized applications. Each cluster also has a master (control plane) that manages the nodes and pods of the cluster. A node represents a single machine in a cluster, typically either a physical machine or virtual machine that is located either on-premises or hosted by a cloud service provider. Each node hosts groups of one or more containers (which run applications), and the master communicates with nodes about when to create or destroy containers and how to re-route traffic based on new container alignments. The Kubernetes master is the access point (or the control plane) from which administrators and other users interact with the cluster to manage the scheduling and deployment of containers.

A pod is the basic unit of scheduling for applications running on a cluster. The applications are running in containers, and each pod includes one or more container(s). While pods are able to house multiple containers, one-container-per-pod may also be used. In some situations, containers that are tightly coupled and need to share resources may sit in the same pod. Pods can quickly and easily communicate with one another as if they were running on the same machine. They do still, however, maintain a degree of isolation. Each pod is assigned a unique IP address within the cluster, allowing the application to use ports without conflict.

When a pod gets created, the pod is scheduled to run on a node. The pod remains on that node until the process is terminated, the pod object is deleted, the pod is evicted for lack of resources, or the node fails. In Kubernetes, pods are the unit of replication. If an application becomes overly popular and a pod can no longer facilitate the load, Kubernetes can deploy replicas of the pod to the cluster.

Software container orchestration platforms, such as Amazon® Elastic Kubernetes Service (Amazon EKS), are services for users to run Kubernetes on the cloud of a cloud computing service provider, such as Amazon® Web Services (AWS®), without the user needing to install, operate, and maintain their own Kubernetes control plane or nodes. An Amazon EKS cluster comprises of two primary components: the Amazon® EKS control plane and Amazon EKS nodes that are registered with the control plane. The Amazon® EKS control plane comprises of control plane nodes that run the Kubernetes software and the Kubernetes application programming interface (API) server. The control plane may run in an account managed by AWS® or the telecommunication service provider, and the Kubernetes API is exposed via the Amazon® EKS endpoint associated with the cluster. Each Amazon® EKS cluster control plane is single-tenant and unique, and runs on its own set of Amazon® Elastic Compute Cloud (EC2) instances, which provide scalable computing capacity in the AWS® cloud.

However, other types of cloud compute instances or virtual machine instances may be used on various other cloud computing provider service platforms. The cluster control plane may be provisioned across multiple Availability Zones (AZs) and fronted by an Elastic Load Balancing Network Load Balancer. Amazon® EKS may also provision clastic network interfaces in VPC subnets to provide connectivity from the control plane instances to the nodes. Amazon® EKS nodes may run in an AWS account of the telecommunication service provider and connects to the telecommunication service provider's cluster control plane via the API server endpoint and a certificate file that is created for the cluster.

As disclosed herein, network functions (NFs) of the 5G NR cellular telecommunication network implemented in respective node groups are useful mechanisms for creating pools of resources in the 5G network that can enforce scheduling requirements. These NFs also provide a utility for shifting workloads around in the 5G network during cluster management and updates. Such NFs of the 5G NR cellular telecommunication network may be hosted on a cloud service provider cloud and referred to herein as cloud-native network functions (CNFs).

In some embodiments, the CU-UP logical node 126 and/or the CU-CP logical node 124 are executed as pods, e.g., one or more of a CU-UP pod and a CU-CP pod running on a first cloud compute instance within a node group of a cluster being hosted on a first cloud compute instance. In other embodiments, the CU-UP logical node 126 and/or the CU-CP logical node 124 are containers, nodes, logical units, or circuits configured to execute firmware and/or software to implement functionality of CU-UP and CU-CP logical nodes, respectively.

FIG. IC depicts a RAN 120 and a core network 130 for providing a communications channel (or channel) between user equipment and data network 180 according to at least one embodiment. The core network 130 includes the UPF 132 for handling user data in the core network 130. Data is transported between the RAN 120 and the core network 130 via the N3 Interface. The data may be tunneled across the N3 Interface (e.g., IP routing may be done on the tunnel header IP address instead of using end user IP addresses). This may allow for maintaining a stable IP anchor point even though the UE 108 may be moving around a network of cells or moving from one coverage area into another coverage area. The UPF 132 may connect to external data networks, such as the data network 180 via the N6 interface. The data may not be tunneled across the N6 interface as IP packets may be routed based on end user IP addresses. The UPF 132 may connect to the SMF 133 via the N4 interface.

In some embodiments, the N3 interface is configured to transfer user plane data (i.e., the actual data traffic like voice, video, internet data, etc.) between the gNB (e.g., the CU-UP logical node 126 of the RAN 120) and the UPF 132. The CU-UP logical node 126 may employ the GPRS Tunneling Protocol for the User plane (GTP-U) over the N3 interface for data packet encapsulation and tunneling. The N3 interface can support the segmentation and reassembly of user plane PDUs. The N3 interface provides mechanisms for path management, which includes establishing, modifying, and releasing GTP-U tunnels, e.g., by the CU-UP logical node 126. The 5G architecture allows for flexible deployment options, and thus the physical distance between gNB and UPF can vary based on the deployment. For example, in edge computing scenarios, the UPF 132 might be located closer to the RAN 120 (and hence the gNB) to reduce latency. Conversely, in other scenarios, the UPF 132 might be more centralized, leading to a longer N3 interface in terms of physical distance.

As depicted, the core network 130 includes a group of control plane functions 140 including SMF 133, AMF 134, PCF 135, NRF 136, AF 137, and NSSF 138. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates). In some cases, multiple SMF/UPF pairs may be used to simultaneously manage user plane traffic for a particular user device, such as UE 108. For example, a set of SMFs may be associated with UE 108, where each SMF of the set of SMFs corresponds with a network slice. The SMF 133 may control the UPF 132 on a per end user data session basis, in which the SMF 133 may create, update, and remove session information in the UPF 132.

In some cases, the SMF 133 may select an appropriate UPF for a user plane path by querying the NRF 136 to identify a list of available UPFs and their corresponding capabilities and locations. The SMF 133 may select the UPF 132 based on a physical location of the UE 108 and a physical location of the UPF 132 (e.g., corresponding with a physical location of a data center in which the UPF 132 is running). The SMF 133 may also select the UPF 132 based on a particular network slice supported by the UPF 132 or based on a particular data network that is connected to the UPF 132. The ability to query the NRF 136 for UPF information eliminates the need for the SMF 133 to store and update the UPF information for every available UPF within the core network 130.

In some embodiments, the SMF 133 may query the NRF 136 to identify a set of available UPFs 132 for a packet data unit (PDU) session and acquire UPF information from a variety of sources, such as the AMF 134 or the UE 108. The UPF information may include a location of the UPF 132, a location of the UE 108, the UPF's dynamic load, the UPF's static capacity among UPFs supporting the same data network, and the capability of the UPF 132.

The RAN 120 may provide separation of the centralized unit for the CU-CP logical node 124 and the CU-UP 126 functionalities while supporting network slicing. The CU-CP logical node 124 may obtain resource utilization and latency information from the DU 121 and/or the CU-UP logical node 126, and select a CU-UP logical node 126 to pair with the DU 121 based on the resource utilization and latency information in order to configure a network slice. Network slice configuration information associated with the network slice may be provided to the UE 108 for purposes of initiating communication with the UPF 132 using the network slice.

In various embodiments, the CU-UP logical node 126 transmits echo request messages to the UPF 132 to track activity and whether or not certain GTP-U tunnels have been established and are still operational. In embodiments, the CU-UP logical node 126 is configured with different timeouts, retry mechanisms, and retry intervals to ensure a steady and reliable connection is maintained between the CU-UP logical node 126 and the UPF 132, e.g., via one or more GTP-U tunnels that have been built therebetween. If the UPF 132 (which may be one of multiple UPFs with which the CU-UP logical node 126 communicates) becomes unresponsive for failing to reply with an echo response message within a timeout period, the CU-UP logical node 126 may retry to send the echo request message to the UPF 132. After a predetermined number of retries of transmitting the echo request message to the UPF 132, the CU-UP logical node 126 may transmit a failure message and the UEs assigned to such a UPF node will experience a service interruption, e.g., loss of data and voice services, which is a highly undesirable degradation of quality of service.

In some embodiments, the timeout period is a maximum amount of time the CU-UP logical node 126 is willing to wait for a response from the UPF 132 during establishment of a connection or after a connection has already been established. In embodiments, the CU-UP logical node 126 detects at least one network requirement associated with network conditions and selects the timeout period from one of a plurality of latency-based timeout values based on the at least one network requirement. For example, varying network conditions can impact the speed, reliability, and overall behavior of network communication. Several factors contribute to varying network conditions such as latency, packet loss, bandwidth fluctuations, jitter, network failures, interference, load balancing, routing changes, and the like. In some embodiments, the latency of the network may be tested by measuring a round-trip time (RTT) between the CU-UP logical node 126 and the UPF node 132. Thus, for example, a longer RTT may warrant a longer retransmission timer to account for potential delay in packet delivery.

Duration of the timeout period may be set in a way that balances responsiveness with avoiding unnecessary delays due to transient network issues. Thus, for example, a low-latency requirement may lead to setting the time period as between 50-200 ms, a standard-latency requirement may lead to setting the time period as between 200-500 ms, and a high-latency requirement may lead to setting the time period as between 500 ms to 1 second.

In some embodiments, the CU-UP logical node 126 selects the predetermined number of echo request messages from one of a plurality of latency-based retry values based on the at least one network requirement, which was discussed previously. In some embodiments, the predetermined number of echo request messages that can be transmitted before the failure message is transmitted corresponds to a maximum number of retries (or retransmissions) that are allowed or can be supported by the network conditions compared to the at least one network requirement.

In embodiments, the CU-UP logical node 126 sets the maximum number of retries of the echo request message as a tradeoff between responsiveness and the potential network load. Too many retries may result in prolonged wait times before declaring the UPF node 132 unreachable, while too few may lead to false negatives. Thus, for example, a low-latency requirement may lead to setting the number of retries as between 3-5 retries, a standard-latency requirement may lead to setting the number of retries as between 5-7 retries, and a high-latency requirement may lead to setting the number of retries as between 7-10 retries.

In some embodiments, the CU-UP logical node 126 may also be configured to customize an interval period as a time interval between consecutive interval requests, e.g., in the event no echo response message is received, also based on network conditions. In this way, the interruption to network bandwidth is spread out and echo request messages are not flooded over a GTP-U tunnel each time the timeout period for an echo request message expires. A longer interval between echo requests reduces the frequency of echo testing, potentially conserving network resources but delaying the detection of issues. A shorter interval increases the frequency of tests, providing more granular monitoring, but may contribute to higher network traffic. Thus, the CU-UP logical node 126 may set the network interval based on network conditions and at least one network requirement related to those conditions. In some embodiments, this interval period is progressively increased to provide increasingly longer backoff periods, giving the UPF node 132 more time to respond to each respective echo request message.

In some embodiments, the CU-UP logical node 126 configures an echo interval to be used once a UPF node is detected to be unreachable (e.g., potential GTP-U tunnel failure) and in which retransmission is not applicable. This configuration may be activated when unreachability is identified, indicating a proactive attempt to recover from GTP-U failures. During the reconnect interval, retransmission of echo requests (e.g., echo request message retries) may be triggered. By excluding echo request retransmissions, the focus is likely on minimizing delays associated with retransmission attempts and quickly adapting to changes in the network state. The effectiveness of the reconnect interval configuration depends on the dynamics of the network, including factors like latency, packet loss, and other potential causes of GTP-U failures. In some embodiments, the CU-UP logical node 126 configures the echo interval to be, e.g., 10 seconds, 30 seconds, 50 seconds, or 60 seconds.

Figure 2A:
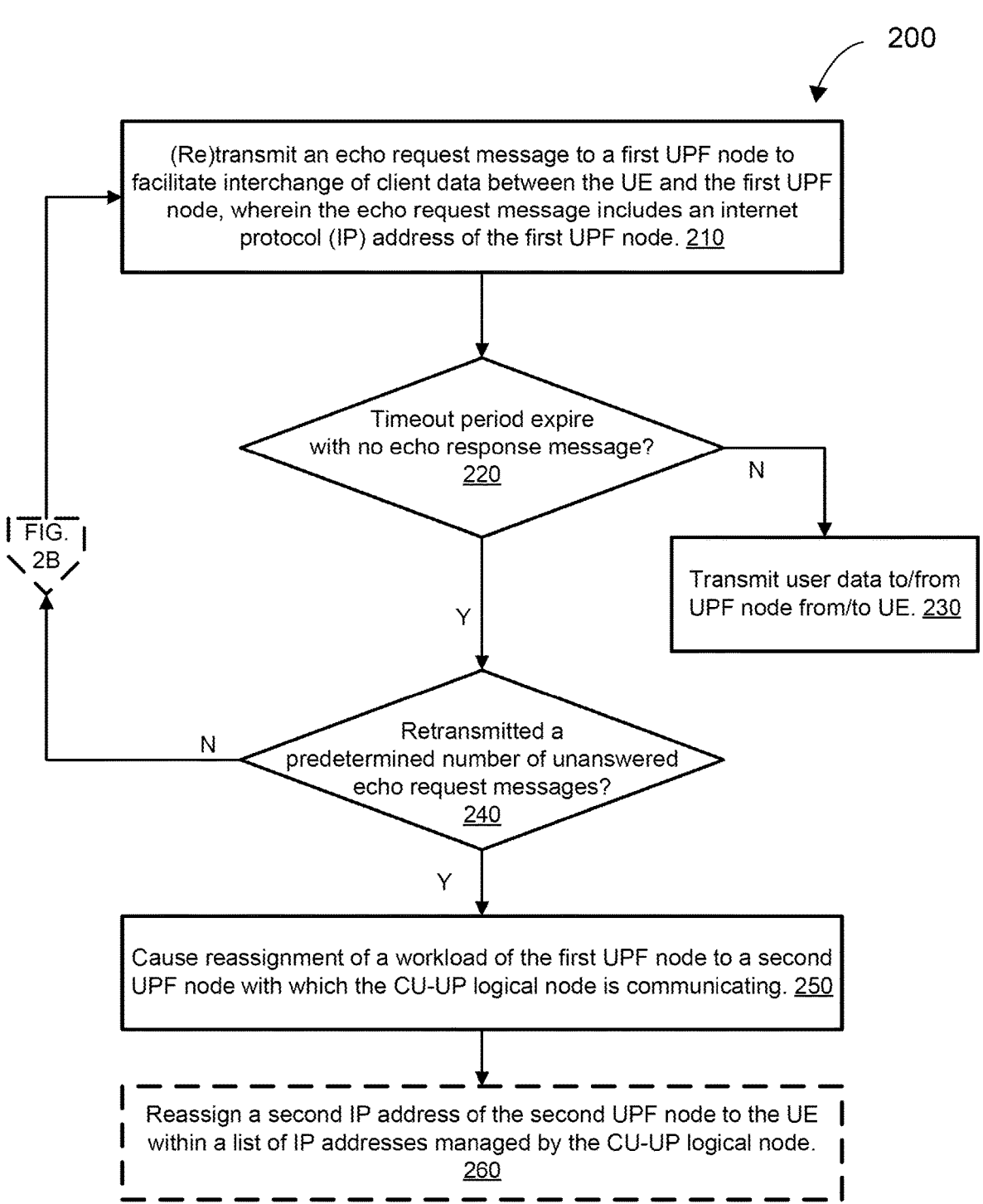
FIG. 2A-FIG. 2B are flow diagrams of a method for detecting and managing a lost connection with a UPF node in a cellular network according to various embodiments.
Figure 2B:
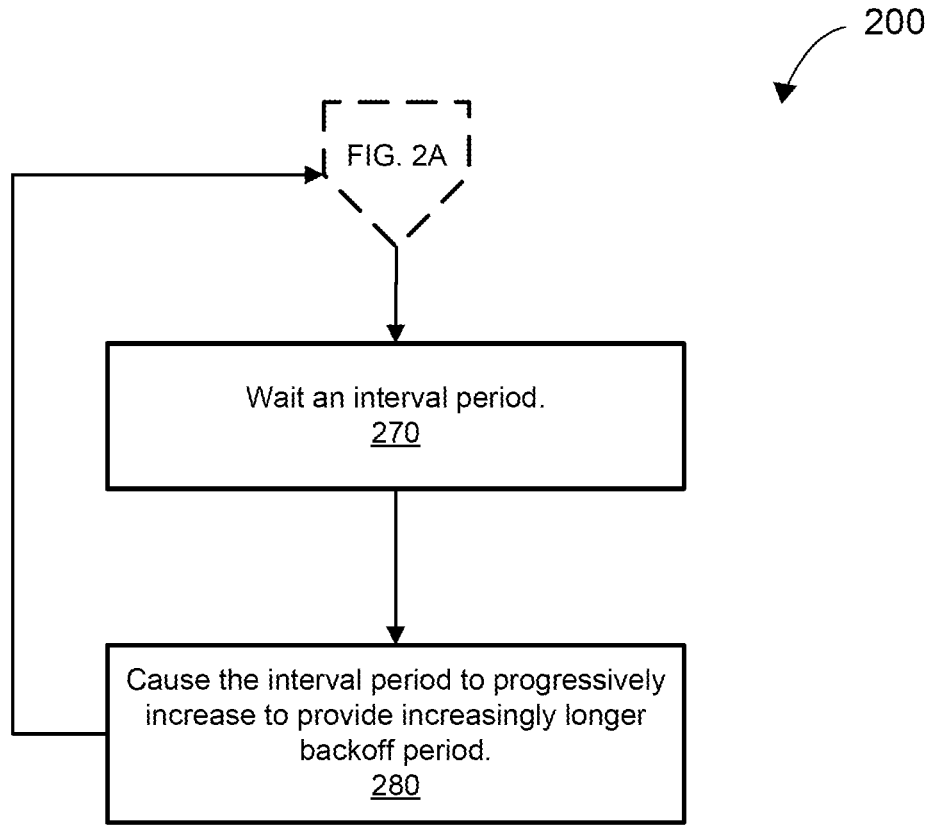

FIG. 2A-FIG. 2B are flow diagrams of a method 200 for detecting and managing a lost connection with a UPF in a cellular network according to various embodiments. The method 200 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 200 is performed by the CU-UP logical node 126 of FIGS. 1B-IC. In various embodiments, the method 200 is performed by the CU 102 of FIG. 1A. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 210, the processing logic transmits an echo request message to a first UPF node to facilitate interchange of client data between a user equipment (UE) and the first UPF node, wherein the echo request message includes an internet protocol (IP) address of the first UPF node. In embodiments, the echo request messages are general packet radio services (GPRS) tunneling protocol for a user plane (GTP-U) messages.

At operation 220, the processing logic determines whether a timeout period expires with no echo response message received from the UPF node. As mentioned previously, the processing logic may also select the timeout period from one of a plurality of latency-based timeout values based on the at least one network requirement.

At operation 230, in response to receiving an echo response message, corresponding to the echo request, from the first UPF node within a timeout period, the processing logic transmits user data to/from the UPF node from/to the UE.

At operation 240, in response to failing to receive an echo response message, corresponding to the echo request, from the first UPF node within a timeout period, the processing logic determines whether the echo request message has been retransmitted a predetermined number of times. As mentioned previously, the processing logic may select the pre-determined number of echo request messages from one of a plurality of latency-based retry values based on the at least one network requirement. Further, operations of FIG. 2B may be optionally performed before a potential retry of an echo request message transmission.

At operation 210, in response to not yet satisfying the predetermined number of retries (or retransmissions) of the echo request message, the processing logic retransmits the echo request message to the first UPF node. This loop of operations 210, 220, and 240 may be performed until satisfying the predetermined number of echo request messages retransmitted to the UPF.

At operation 250, in response to retransmitting the pre-determined number of echo request messages without receipt of a corresponding echo response message from the first UPF node, the processing logic causes reassignment of a workload of the first UPF node to a second UPF node with which the CU-UP logical node 126 is communicating. In some embodiments, causing reassignment of the workload to the second UPF node includes transferring, to the second UPF node, critical state information associated with the first UPF node to maintain session continuity with the UE. In various embodiments, the critical state information includes a session identifier, a speed of connection, and/or information about data tunnels. This information about data tunnels (e.g., GTP-U tunnels) may include tunnel identifiers, endpoint information, a security profile, and the like, or a combination thereof. In embodiments, multiple UPF nodes are identified as potential replacement nodes for respective other UPF nodes in the event of failure of a particular UPF node.

At operation 260, the processing logic optionally also reassigns a second IP address of the second UPF node to the UE within a list of IP addresses managed by the CU-UP logical node. Each IP address in the list may correspond to a current UPF node with which the CU-UP logical node communicates to support connected UEs.

With reference to FIG. 2B, at operation 270, the processing logic may wait for an interval period between expiration of the timeout period and retransmit the echo request message.

At operation 280, the processing logic causes the interval period to progressively increase to provide increasingly longer backoff periods, giving the first UPF node more time to respond to respective echo request messages.

Figure 3A:
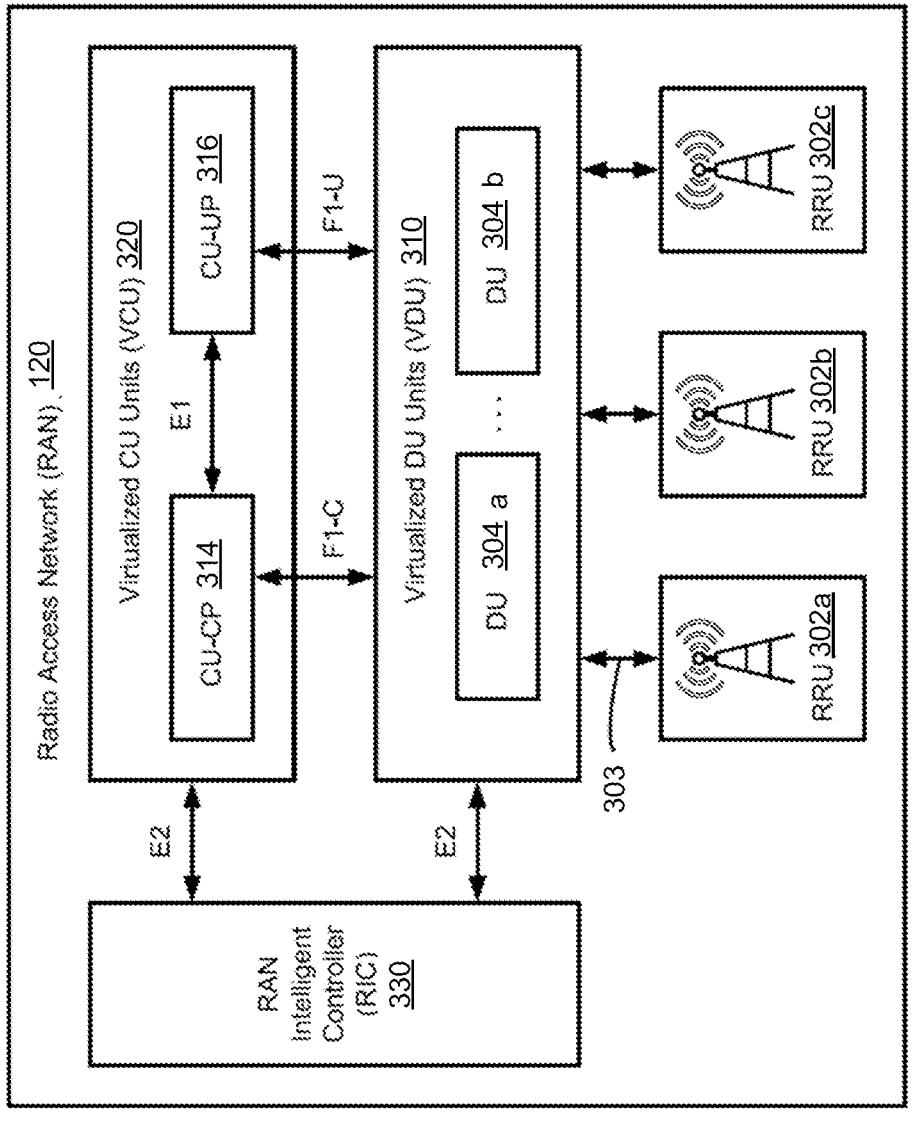
FIG. 3A-FIG. 3B depict a radio access network according to various embodiments.

FIG. 3A depicts a RAN 120 according to at least one embodiment. The RAN 120 includes virtualized CU units (VCU) 320, virtualized DU units (VDU) 310, remote radio units (RRUs) 302a-302c, and a RAN intelligent controller (RIC) 330. The virtualized DU units 310 can include virtualized versions of distributed units (DUs) 304. The distributed unit (DU) 304 can include a logical node configured to provide functions for the radio link control (RLC) layer, the medium access control (MAC) layer, and the physical layer (PHY) layers. The virtualized CU units 320 can include virtualized versions of centralized units (CUs) including a centralized unit for a user plane CU-UP 326 and a centralized unit for a control plane CU-CP 314. In one example, the centralized units (CUs) can include a logical node configured to provide functions for the radio resource control (RRC) layer, the packet data convergence control (PDCP) layer, and the service data adaptation protocol (SDAP) layer. The centralized unit for the control plane CU-CP 314 can include a logical node configured to provide functions of the control plane part of the RRC and PDCP. The centralized unit for the user plane CU-UP 326 can include a logical node configured to provide functions of the user plane part of the SDAP and PDCP. Virtualizing the control plane and user plane functions allows the centralized units (CUs) to be consolidated in one or more data centers on RAN-based open interfaces.

The remote radio units (RRUs) 302a-302c may correspond with different cell sites. A single DU may connect to multiple RRUs via a fronthaul interface 303. The fronthaul interface 303 may provide connectivity between DUs and RRUs. For example, DU 304a may connect to 18 RRUs via the fronthaul interface 303. Centralized units (CUs) may control the operation of multiple DUs via a midhaul F1 Interface that includes the F1-C and F1-U interfaces. The F1 Interface may support control plane and user plane separation, and separate the Radio Network Layer and the Transport Network Layer. In one example, the centralized unit for the control plane CU-CP 314 may connect to ten different DUs within the virtualized DU units 310. In this case, the centralized unit for the control plane CU-CP 314 may control ten DUs and 180 RRUs. A single Distributed Unit (DU) 304 may be located at a cell site or in a local data center. Centralizing the Distributed Unit (DU) 304 at a local data center or at a single cell site location instead of distributing the DU 304 across multiple cell sites may result in reduced implementation costs.

The centralized unit for the control plane CU-CP 314 may host the radio resource control (RRC) layer and the control plane part of the packet data convergence control (PDCP) layer. The E1 Interface may separate the Radio Network Layer and the Transport Network Layer. The CU-CP 314 terminates the E1 Interface connected with the centralized unit for the user plane CU-UP 316 and the F1-C interface connected with the distributed units (DUs) 304. The centralized unit for the user plane CU-UP 316 hosts the user plane part of the packet data convergence control (PDCP) layer and the service data adaptation protocol (SDAP) layer. The CU-UP 316 terminates the E1 Interface connected with the centralized unit for the control plane CU-CP 314 and the F1-U interface connected with the distributed units (DUs) DU 304. The distributed units (DUs) 304 may handle the lower layers of the baseband processing up through the packet data convergence control (PDCP) layer of the protocol stack. The interfaces F1-C and E1 may carry signaling information for setting up, modifying, relocating, and/or releasing a UE context.

The RAN intelligent controller (RIC) 330 may control the underlying RAN elements via the E2 Interface. The E2 Interface connects the RAN intelligent controller (RIC) 330 to the distributed units (DUs) 304 and the centralized units CU-CP 314 and CU-UP 316. The RAN intelligent controller (RIC) 330 can include a near-real time RIC. A non-real-time RIC (NRT-RIC) not depicted can include a logical node allowing non-real time control rather than near-real-time control and the near-real-time RIC 330 can include a logical node allowing near-real-time control and optimization of RAN elements and resources on the bases of information collected from the distributed units (DUs) 304 and the centralized units CU-CP 314 and CU-UP logical node 316 via the E2 Interface.

The virtualization of the distributed units (DUs) 304 and the centralized units CU-CP 314 and CU-UP 316 allows various deployment options that may be adjusted over time based on network conditions and network slice requirements. In at least one example, both a Distributed Unit (DU) 304 and a corresponding centralized unit CU-UP 316 may be implemented at a cell site. In another example, a Distributed Unit (DU) 304 may be implemented at a cell site and the corresponding centralized unit CU-UP 316 may be implemented at a local data center (LDC). In another example, both a Distributed Unit (DU) 304 and a corresponding centralized unit CU-UP 316 may be implemented at a local data center (LDC). In another example, both a Distributed Unit (DU) 304 and a corresponding centralized unit CU-UP 316 may be implemented at a cell site, but the corresponding the centralized unit CU-CP logical node 314 may be implemented at a local data center (LDC). In another example, a Distributed Unit (DU) 304 may be implemented at a local data center (LDC) and the corresponding centralized units CU-CP 314 and CU-UP 316 may be implemented at an edge data center (EDC).

In some embodiments, network slicing operations may be communicated via the E1, F1-C, and F1-U interfaces of the RAN 120. For example, CU-CP 314 may select the appropriate DU 304 and CU-UP 316 entities to serve a network slicing request associated with a particular service level agreement (SLA).

Figure 3B:
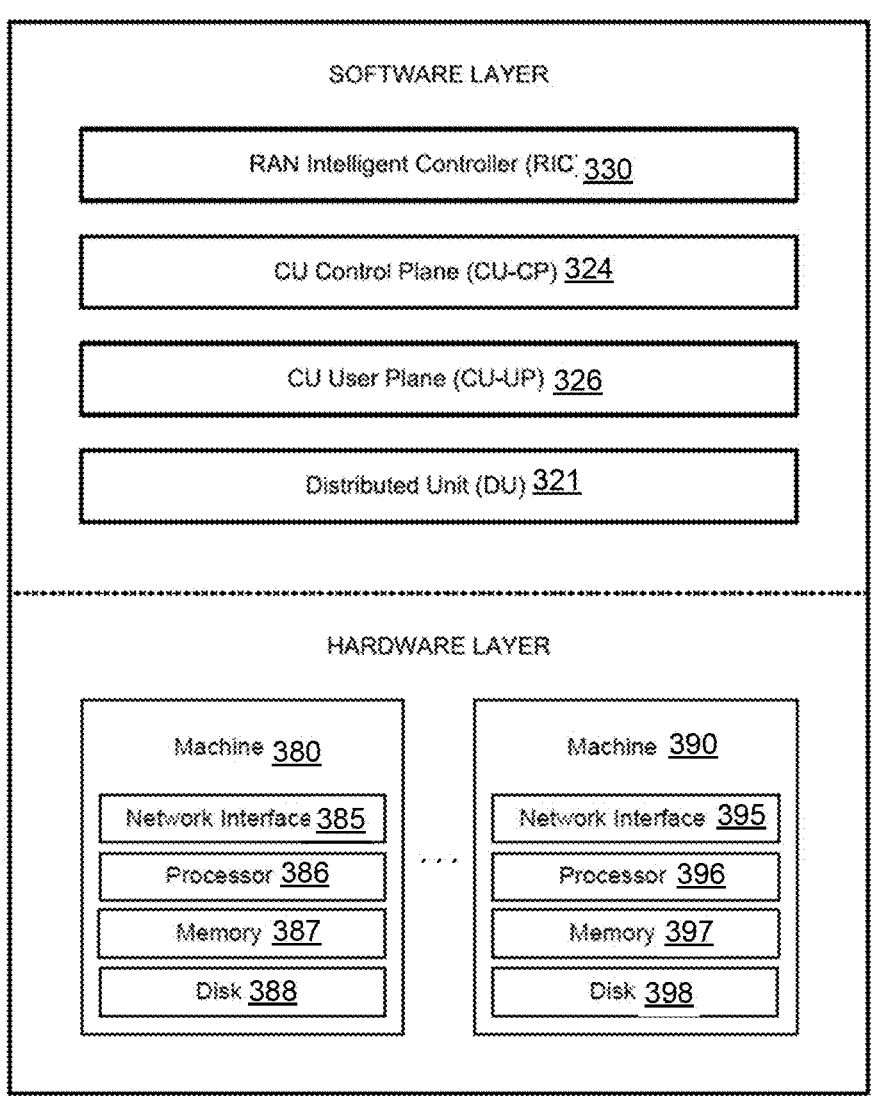

FIG. 3B depicts a RAN 120 according to at least one embodiment. As depicted, the RAN 120 includes hardware-level components and software-level components. The hardware-level components include a set of machines (e.g., physical machines) that may be grouped together and presented as a single computing system or a cluster. Each machine of the set of machines can include a node in a cluster (e.g., a failover cluster).

As depicted, the set of machines include machine 380 and machine 390. The machine 380 includes a network interface 385, processor 386, memory 387, and disk 388 all in communication with each other. Processor 386 allows machine 380 to execute computer readable instructions stored in memory 387 to perform processes described herein. Processor 386 may include one or more processing units, such as one or more CPUs and/or one or more GPUs. Memory 387 can include one or more types of memory (e.g., RAM, SRAM, DRAM, ROM, EEPROM, or Flash). The disk 388 can include a hard disk drive and/or a solid-state drive. Similarly, the machine 390 includes a network interface 395, processor 396, memory 397, and disk 398 all in communication with each other. Processor 396 allows machine 390 to execute computer readable instructions stored in memory 397 to perform processes described herein. In some embodiments, the set of machines may be used to implement a failover cluster. In some cases, the set of machines may be used to run one or more virtual machines or to execute or generate a containerized environment, such as a containerized environment.

The software-level components include a RAN intelligent controller (RIC) 330, CU control plane (CU-CP) 324, CU user plane (CU-UP) 326, and Distributed Unit (DU) 321. In one embodiment, the software-level components may be run using a dedicated hardware server. In another embodiment, the software-level components may be run using a virtual machine running or containerized environment running on the set of machines. In another embodiment, the software-level components may be run from the cloud (e.g., the software-level components may be deployed using a cloud-based compute and storage infrastructure).

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions. One or more non-transitory, computer-readable storage media can have computer-readable instructions stored thereon which, when executed by one or more processing devices, cause the one or more processing devices to perform the operations described herein.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A computing system for establishing communication between a centralized unit-user plane (CU-UP) logical node and user plane function (UPF) nodes in a cellular network, wherein the computing system comprises:
  one or more processing devices; and
  memory communicatively coupled with and readable by the one or more processing devices and having stored therein processor-readable instructions which, when executed by the one or more processing devices, cause the one or more processing devices to perform operations comprising:
    transmit an echo request message to a first UPF node to facilitate interchange of client data between a user equipment (UE) and the first UPF node, wherein the echo request message includes an internet protocol (IP) address of the first UPF node;
    in response to failing to receive an echo response message, corresponding to the echo request message, from the first UPF node within a timeout period, retransmitting the echo request message to the first UPF node; and in response to retransmitting a predetermined number of echo request messages without receipt of a corresponding echo response message from the first UPF node, causing reassignment of a workload of the first UPF node to a second UPF node with which the CU-UP logical node is communicating.

2. The computing system of claim 1, wherein the operations further comprise reassigning a second IP address of the second UPF node to the UE within a list of IP addresses managed by the CU-UP logical node.

3. The computing system of claim 1, wherein the echo request messages are general packet radio services (GPRS) tunneling protocol for a user plane (GTP-U) messages.

4. The computing system of claim 1, wherein causing reassignment of the workload to the second UPF node comprises transferring, to the second UPF node, critical state information associated with the first UPF node to maintain session continuity with the UE.

5. The computing system of claim 4, wherein the critical state information comprises one or more of a session identifier, a speed of connection, or information about data tunnels including i) one or more tunnel identifiers, ii) endpoint information, or iii) a security profile.

6. The computing system of claim 1, wherein the operations further comprise:
  detecting at least one network requirement associated with network conditions; and
  selecting the timeout period from one of a plurality of latency-based timeout values based on the at least one network requirement.

7. The computing system of claim 1, wherein the operations further comprise:
  detecting at least one network requirement associated with network conditions; and
  selecting the predetermined number of echo request messages from one of a plurality of latency-based retry values based on the at least one network requirement.

8. The computing system of claim 1, wherein the operations further comprise:
  waiting for an interval period between expiration of the timeout period and retransmitting the echo request message; and
  causing the interval period to progressively increase to provide increasingly longer backoff periods, giving the first UPF node more time to respond to respective echo request messages.

9. A method of operating a computing system for establishing communication between a centralized unit-user plane (CU-UP) logical node and user plane function (UPF) nodes in a cellular network, wherein the method comprises:
  transmitting, by the CU-UP logical node, an echo request message to a first UPF node to facilitate interchange of client data between a user equipment (UE) and the first UPF node, wherein the echo request message includes an internet protocol (IP) address of the first UPF node;
  in response to failing to receive an echo response message, corresponding to the echo request message, from the first UPF node within a timeout period, retransmitting the echo request message to the first UPF node; and
  in response to retransmitting a predetermined number of echo request messages without receipt of a corresponding echo response message from the first UPF node, causing, by the CU-UP logical node, reassignment of a workload of the first UPF node to a second UPF node with which the CU-UP logical node is communicating.

10. The method of claim 9, further comprising reassigning, by the CU-UP logical node, a second IP address of the second UPF node to the UE within a list of IP addresses managed by the CU-UP logical node.

11. The method of claim 9, wherein the echo request messages are general packet radio services (GPRS) tunneling protocol for a user plane (GTP-U) messages.

12. The method of claim 9, wherein causing reassignment of the workload to the second UPF node comprises transferring, to the second UPF node, critical state information associated with the first UPF node to maintain session continuity with the UE.

13. The method of claim 12, wherein the critical state information comprises one or more of a session identifier, a speed of connection, or details about data tunnels including i) one or more tunnel identifiers, ii) endpoint information, or iii) a security profile.

14. The method of claim 9, further comprising:

detecting at least one network requirement associated with network conditions; and selecting the timeout period from one of a plurality of latency-based timeout values based on the at least one network requirement.

15. The method of claim 9, further comprising:

detecting at least one network requirement associated with network conditions; and selecting the predetermined number of echo request messages from one of a plurality of latency-based retry values based on the at least one network requirement.

16. The method of claim 9, further comprising:

waiting for an interval period between expiration of the timeout period and retransmitting the echo request message; and causing the interval period to progressively increase to provide increasingly longer backoff periods, giving the first UPF node more time to respond to respective echo request messages.

17. One or more non-transitory, computer-readable storage media having computer-readable instructions thereon which, when executed by one or more processing devices, cause the one or more processing devices to perform operations comprising:

transmitting, by a centralized unit-user plane (CU-UP) logical node, an echo request message to a first user plane function (UPF) node to facilitate interchange of client data between a user equipment (UE) and the first UPF node, wherein the echo request message includes an internet protocol (IP) address of the first UPF node;

in response to failing to receive an echo response message, corresponding to the echo request message, from the first UPF node within a timeout period, retransmitting the echo request message to the first UPF node; and in response to retransmitting a predetermined number of echo request messages without receipt of a corresponding echo response message from the first UPF node, causing, by the CU-UP logical node, reassignment of a workload of the first UPF node to a second UPF node with which the CU-UP logical node is communicating.

18. The one or more non-transitory, computer-readable storage media of claim 17, wherein the operations further comprise reassigning, by the CU-UP logical node, a second IP address of the second UPF node to the UE within a list of IP addresses managed by the CU-UP logical node.

19. The one or more non-transitory, computer-readable storage media of claim 17, wherein causing reassignment of the workload to the second UPF node comprises transferring, to the second UPF node, critical state information associated with the first UPF node to maintain session continuity with the UE.

20. The one or more non-transitory, computer-readable storage media of claim 19, wherein the critical state information comprises one or more of a session identifier, a speed of connection, or details about data tunnels including i) one or more tunnel identifiers, ii) endpoint information, or iii) a security profile.

* * * * *